(12) United States Patent
Das et al.

(10) Patent No.: US 8,923,157 B2
(45) Date of Patent: Dec. 30, 2014

(54) SCHEDULING QOS FLOWS IN BROADBAND WIRELESS COMMUNICATION SYSTEMS

(75) Inventors: Arnab Das, Bethesda, MD (US); Ritesh Madan, Jersey City, NJ (US); Sundeep Rangan, Jersey City, NJ (US); Sanjay Shakkottai, Austin, TX (US); Siddharth Ray, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 12/264,051

(22) Filed: Nov. 3, 2008

(65) Prior Publication Data

US 2009/0122717 A1 May 14, 2009

Related U.S. Application Data

(60) Provisional application No. 60/985,614, filed on Nov. 5, 2007.

(51) Int. Cl.
*G01R 31/08* (2006.01)
*G06F 11/00* (2006.01)
(Continued)

(52) U.S. Cl.
CPC ............ *H04L 47/10* (2013.01); *H04L 12/5695* (2013.01); *H04L 47/14* (2013.01); *H04L 47/2441* (2013.01); *H04L 47/283* (2013.01); *H04L 47/30* (2013.01); *H04L 47/762* (2013.01); *H04L 47/803* (2013.01); *H04L 47/824* (2013.01); *H04W 72/1205* (2013.01)
USPC ...................................... 370/253

(58) Field of Classification Search
USPC .............................. 370/252, 253, 232, 395.41
See application file for complete search history.

(56) References Cited

U.S. PATENT DOCUMENTS 5,802,310 A * 9/1998 Rajaraman .................... 709/234
6,018,663 A * 1/2000 Karlsson et al. .............. 455/450
(Continued)

FOREIGN PATENT DOCUMENTS

EP          1746787 A1    1/2007
JP       2004248105 A    9/2004
(Continued)

OTHER PUBLICATIONS

International Search Report/Written Opinion—PCT/US08/082448-International Search Authority EPO—May 6, 2009.
(Continued)

*Primary Examiner* — Huy D Vu
*Assistant Examiner* — Adnan Baig
(74) *Attorney, Agent, or Firm* — Charles E. Eiggers

(57) ABSTRACT

Systems and methodologies are described that facilitate enhanced resource scheduling for a wireless communication system. As described herein, packets associated with a common flow that arrive within a predetermined time period following a leading packet associated with the flow can be grouped into respective packet bursts. Subsequently, system bandwidth, transmit power, and/or other communication resources can be scheduled based on an analysis of the respective packet bursts. As provided herein, by analyzing respective packet bursts in lieu of individual packets, computational and resource overhead required for resource scheduling can be significantly reduced. In one example described herein, a resource schedule is determined by selecting one or more flows to be assigned bandwidth from among a plurality of flows based on an analysis of packet bursts respectively associated with the flows. Sufficient bandwidth can subsequently be scheduled for the selected flows for transmission of the respectively associated packet bursts.

42 Claims, 13 Drawing Sheets

(51) Int. Cl.

| | | |
|---|---|---|
| *G08C 15/00* | (2006.01) | |
| *H04J 1/16* | (2006.01) | |
| *H04J 3/14* | (2006.01) | |
| *H04L 1/00* | (2006.01) | |
| *H04L 12/26* | (2006.01) | |
| *H04L 12/801* | (2013.01) | |
| *H04L 12/54* | (2013.01) | |
| *H04L 12/851* | (2013.01) | |
| *H04L 12/841* | (2013.01) | |
| *H04L 12/835* | (2013.01) | |
| *H04L 12/923* | (2013.01) | |
| *H04L 12/927* | (2013.01) | |
| *H04L 12/911* | (2013.01) | |
| *H04W 72/12* | (2009.01) | |

(56) References Cited

U.S. PATENT DOCUMENTS

| | | | |
|---|---|---|---|
| 6,452,915 B1 | 9/2002 | Jorgensen | |
| 6,452,933 B1* | 9/2002 | Duffield et al. | 370/415 |
| 6,522,628 B1 | 2/2003 | Patel et al. | |
| 7,583,700 B1* | 9/2009 | Lin | 370/469 |
| 7,586,909 B1* | 9/2009 | Walrand et al. | 370/388 |
| 2003/0031193 A1* | 2/2003 | Andrews et al. | 370/412 |
| 2003/0198204 A1* | 10/2003 | Taneja et al. | 370/332 |
| 2004/0190507 A1 | 9/2004 | Wu et al. | |
| 2005/0002371 A1* | 1/2005 | Andersen | 370/346 |
| 2005/0143018 A1* | 6/2005 | Shinozaki | 455/76 |
| 2005/0242330 A1 | 11/2005 | Herman et al. | |
| 2005/0249220 A1 | 11/2005 | Olsen et al. | |
| 2007/0058544 A1* | 3/2007 | Kim et al. | 370/230 |
| 2007/0070896 A1* | 3/2007 | Alapuranen et al. | 370/230 |
| 2007/0211625 A1* | 9/2007 | Liu et al. | 370/229 |
| 2007/0230335 A1 | 10/2007 | Sang et al. | |
| 2011/0182248 A1* | 7/2011 | Fan et al. | 370/329 |

FOREIGN PATENT DOCUMENTS

| | | |
|---|---|---|
| JP | 2007028638 A | 2/2007 |
| JP | 2007159131 A | 6/2007 |
| WO | WO2006098550 | 9/2006 |

OTHER PUBLICATIONS

European Search Report—EP10171288—Search Authority—Munich—Sep. 17, 2010.

Yuan Chi et al.,"A Novel Burst Assembly Algorithm for OBS networks—Based on Data-length Time-lag Product", Asia-Pacific Conference on Communications, Perth, Western Australia, pp. 319-323, Oct. 3-5, 2005.

Taiwan Search Report—TW097142705—TIPO—Dec. 27, 2011.

* cited by examiner

SCHEDULING QOS FLOWS IN BROADBAND WIRELESS COMMUNICATION SYSTEMS

CROSS-REFERENCE

This application claims the benefit of U.S. Provisional Application Ser. No. 60/985,614, filed Nov. 5, 2007, and entitled "SCHEDULING QOS FLOWS IN BROADBAND WIRELESS COMMUNICATION SYSTEMS," the entirety of which is incorporated herein by reference.

BACKGROUND

I. Field

The present disclosure relates generally to wireless communications, and more specifically to techniques for scheduling resources in a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

In broadband wireless communication systems and/or other communication systems, resources can be scheduled for one or more flows that utilize the system based on various factors. For example, resources can be scheduled for flows having delay constraints based on channel quality, packet delay, and/or other suitable factors. Traditionally, such factors are analyzed on a packet-by-packet basis for each queued packet to be transmitted. However, for systems that utilize high system bandwidth and/or a high number of flows, systems that determine resource allocations within short time intervals (e.g., 1 ms or less), and/or other wireless communication systems, it would be desirable to implement one or more resource scheduling techniques that can operate based on imperfect queue state information.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method for scheduling resources in a wireless communication system is described herein. The method can comprise identifying one or more flows that are yet to be assigned bandwidth; associating respective packet bursts with the one or more flows, the packet bursts respectively comprising a leading packet for an associated flow and one or more packets that arrive for the associated flow within a predetermined time period of the leading packet; analyzing the respective packet bursts; and determining an order by which bandwidth is to be assigned to the one or more flows based on the analysis of the respective packet bursts.

Another aspect relates to a wireless communications apparatus that can comprise a memory that stores data relating to one or more flows for which communication resources are to be assigned. The wireless communications apparatus can further comprise a processor configured to analyze bursts of packets on the respective flows that respectively include a head packet for a flow and one or more packets that arrive for the flow within a preconfigured time interval after the head packet and to identify a flow to receive an assignment of communication resources based on an analysis of bursts of packets respectively corresponding to the one or more flows.

A third aspect relates to an apparatus that facilitates burst-based packet scheduling in a wireless communication system. The apparatus can comprise means for identifying one or more of delay parameters or channel quality parameters relating to a burst of packets buffered within a predetermined time period; and means for assigning resources for transmission of a burst of packets selected as a function of one or more of identified delay parameters or identified channel quality parameters.

A fourth aspect relates to a computer program product, which can comprise a computer-readable medium that includes code for identifying one or more flows having associated therewith one or more packets for which resources are to be assigned for communication thereof, code for grouping packets associated with a common flow that originated within a predetermined time interval into respective packet bursts; code for identifying one or more of delay parameters or channel quality parameters associated with the respective packet bursts; and code for assigning resources for communication of a packet burst as a function of one or more parameters associated with the respective packet bursts.

A fifth aspect relates to an integrated circuit that executes computer-executable instructions for resource scheduling in a wireless communication system. The instructions can comprise selecting, from among a plurality of flows which are yet to be assigned bandwidth, a flow with a highest function of head-of-line delay and queue length; scheduling a transmission of a leading packet associated with a selected flow and one or more packets associated with the selected flow which originated within a preconfigured time interval following the leading packet; and assigning bandwidth for the scheduled transmission.

In accordance with another aspect, a method for communicating feedback information in a wireless communication system is described herein. The method can comprise grouping one or more packets buffered within a predetermined time period for transmission on a common flow into a packet burst; determining a length of the packet burst; and communicating the length of the packet burst to a serving base station.

Another aspect relates to a wireless communications apparatus that can comprise a memory that stores data relating to one or more packets associated with a common flow and a time interval. The wireless communications apparatus can further comprise a processor configured to determine an amount of packets associated with the common flow that originated within the time interval from a leading packet associated with the common flow and to communicate the determined amount of packets within a transmission of control signaling.

Yet another aspect relates to an apparatus that facilitates packet burst feedback in a wireless communication system. The apparatus can comprise means for grouping packets that arrive in a time window of a preconfigured size into respective bursts; and means for communicating feedback relating to lengths of the respective bursts and at least one of delay parameters or channel quality parameters associated with the respective bursts.

Still another aspect relates to a computer program product, which can comprise a computer-readable medium that includes code for identifying a packet burst that includes a leading packet designated for a flow and one or more packets for the flow that originated within a preconfigured time of the leading packet; code for determining one or more feedback parameters relating to the packet burst, the feedback parameters comprising a length of the packet burst; and code for transmitting control signaling comprising the one or more feedback parameters.

A further aspect relates to an integrated circuit that executes computer-executable instructions for managing feedback relating to a wireless communication device. The instructions can comprise identifying a grouping of packets designated for a flow having times of origination within a preconfigured time interval of a head packet designated for the flow; determining a number of packets in the identified grouping; and conveying the determined number of packets in combination with feedback relating to the head packet designated for the flow to a serving base station.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
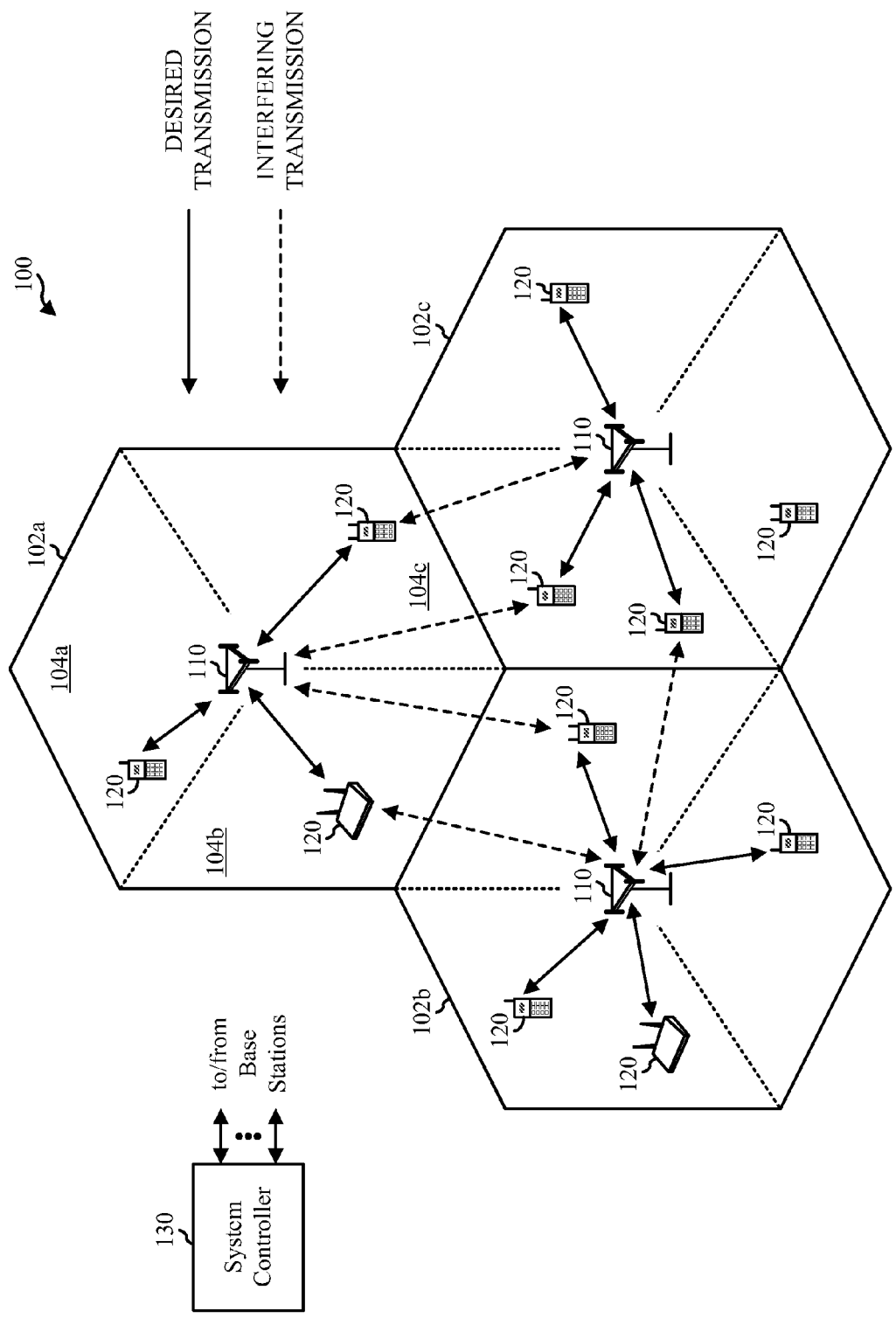
FIG. 1 illustrates a wireless multiple-access communication system in accordance with various aspects set forth herein.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 is an illustration of a wireless multiple-access communication system 100 in accordance with various aspects. In one example, the wireless multiple-access communication system 100 includes multiple base stations 110 and multiple terminals 120. Further, one or more base stations 110 can communicate with one or more terminals 120. By way of non-limiting example, a base station 110 can be an access point, a Node B (e.g., an Evolved Node B or eNB), and/or another appropriate network entity. Each base station 110 provides communication coverage for a particular geographic area 102. As used herein and generally in the art, the term "cell" can refer to a base station 110 and/or its coverage area 102 depending on the context in which the term is used.

To improve system capacity, the coverage area 102 corresponding to a base station 110 can be partitioned into multiple smaller areas (e.g., areas 104a, 104b, and 104c). Each of the smaller areas 104a, 104b, and 104c can be served by a respective base transceiver subsystem (BTS, not shown). As used herein and generally in the art, the term "sector" can refer to a BTS and/or its coverage area depending on the context in which the term is used. Further, as used herein and generally in the art, the term "cell" can also be used to refer to the coverage area of a BTS depending on the context in which the term is used. In one example, sectors 104 in a cell 102 can be formed by groups of antennas (not shown) at base station 110, where each group of antennas is responsible for communication with terminals 120 in a portion of the cell 102. For example, a base station 110 serving cell 102a can have a first antenna group corresponding to sector 104a, a second antenna group corresponding to sector 104b, and a third antenna group corresponding to sector 104c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell.

In accordance with one aspect, terminals 120 can be dispersed throughout the system 100. Each terminal 120 can be stationary or mobile. By way of non-limiting example, a terminal 120 can be an access terminal (AT), a mobile station, user equipment (UE), a subscriber station, and/or another appropriate network entity. A terminal 120 can be a wireless device, a cellular phone, a personal digital assistant (PDA), a wireless modem, a handheld device, or another appropriate device. Further, a terminal 120 can communicate with any number of base stations 110 or no base stations 110 at any given moment.

In another example, the system 100 can utilize a centralized architecture by employing a system controller 130 that can be coupled to one or more base stations 110 and provide coordination and control for the base stations 110. In accordance with alternative aspects, system controller 130 can be a single network entity or a collection of network entities. Additionally, the system 100 can utilize a distributed architecture to allow the base stations 110 to communicate with each other as needed. In one example, system controller 130 can additionally contain one or more connections to multiple networks. These networks can include the Internet, other packet based networks, and/or circuit switched voice networks that can provide information to and/or from terminals 120 in communication with one or more base stations 110 in system 100. In another example, system controller 130 can include or be coupled with a scheduler (not shown) that can schedule transmissions to and/or from terminals 120. Alternatively, the scheduler can reside in each individual cell 102, each sector 104, or a combination thereof.

As further illustrated by FIG. 1, each sector 104 in system 100 can receive "desired" transmissions from terminals 120 in the sector 104 as well as "interfering" transmissions from terminals 120 in other sectors 104. The total interference observed at a given sector 104 can include both intra-sector interference from terminals 120 within the same sector 104 and inter-sector interference from terminals 120 in other sectors 104. In one example, intra-sector interference can be substantially eliminated using OFDMA transmission from the terminals 120, which ensures orthogonality between transmissions of different terminals 120 in the same sector 104. Inter-sector interference, which is also known in the art as other sector interference (OSI), can result when transmissions in one sector 104 are not orthogonal to transmissions in other sectors 104.

Figure 2:
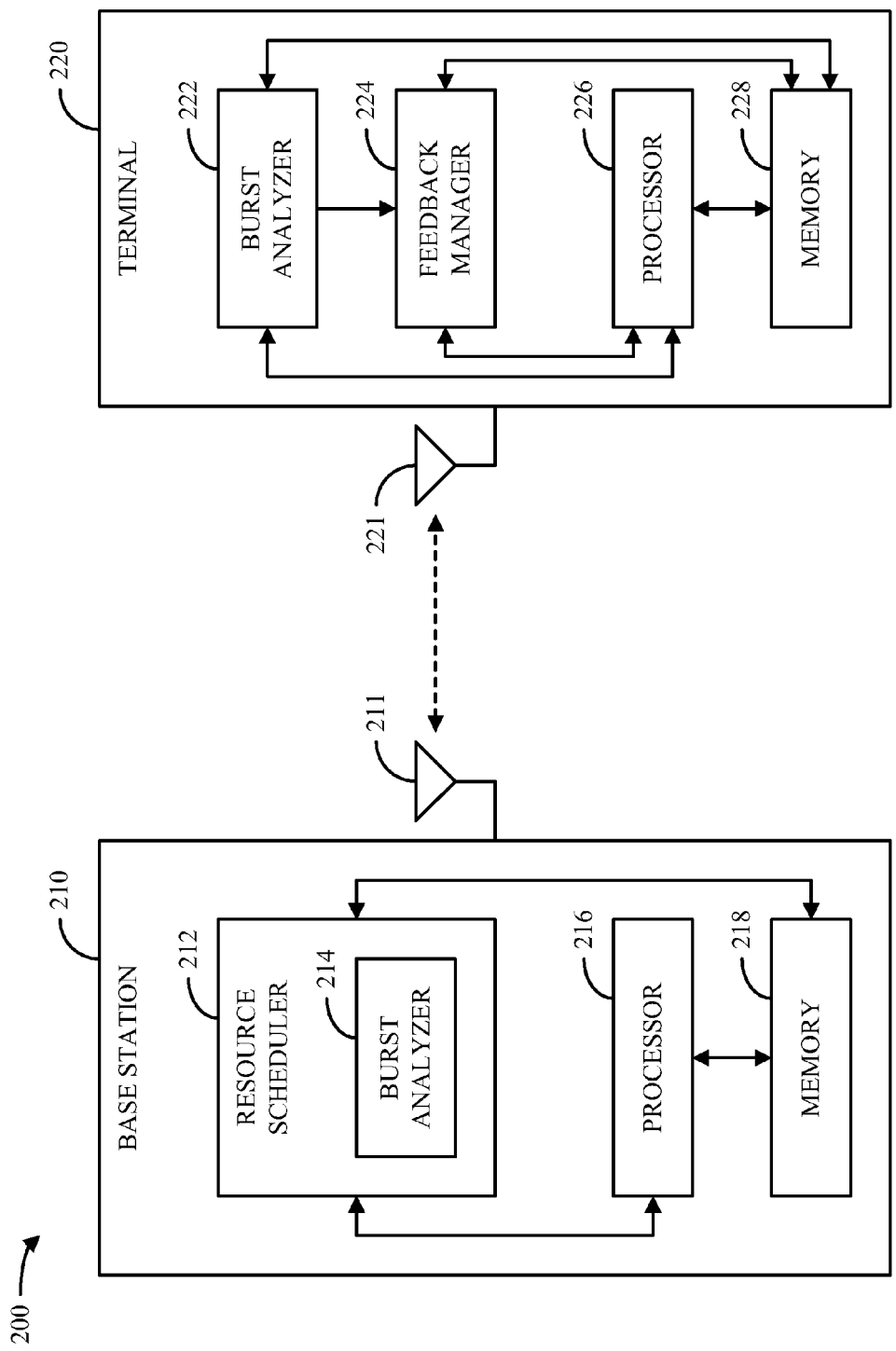
FIG. 2 is a block diagram of a system for scheduling resources in a wireless communication system in accordance with various aspects.

FIG. 2 is a block diagram of a system 200 for scheduling resources in a wireless communication system in accordance with various aspects provided herein. In accordance with one aspect, system 200 can include one or more base stations 210 and one or more terminals 220, which can communicate with each other on the uplink and/or downlink via respective antennas 211 and/or 221. It can be appreciated that system 200 can include any number of base stations 210 and/or terminals 220, each of which can communicate with other entities in system 200 via any number of antennas 211 and/or 221.

In one example, a base station 210 and terminal 220 in system 200 can communicate pursuant to one or more resource assignments issued for said communication. For example, as illustrated by system 200, base station 210 can utilize a resource scheduler 212 to schedule resources to be utilized by base station 210 and/or terminal 220 for communication based in whole or in part on feedback obtained from terminal 220 via a feedback manager 224 associated therewith. In one example, feedback manager 224 can generate and/or facilitate communication of feedback relating to channel quality, transmit queue length, delay information, and/or other information as observed by terminal 220. It should be appreciated, however, that while resource scheduler 212 is illustrated at base station 210 and feedback manager 224 is illustrated at terminal 220, respective base stations 210 and/or terminals 220 in system 200 can have the functionality of either a resource scheduler 212 or a feedback manager 224.

In accordance with one aspect, a resource scheduler 212 can be utilized within system 200 to compute an allocation of resources such as power and/or bandwidth for one or more flows that utilize system 200 based on various factors. For example, resource scheduler 212 can allocate resources to various flows to ensure fairness between flows, to meet quality of service (QoS) constraints, to exploit multi-user diversity, and so on. In one example, flows for which resource scheduler 212 can schedule resources can include best effort or "elastic" flows, delay QoS-sensitive or "inelastic" flows, and the like. As used herein, a delay sensitive flow is a flow wherein each packet is associated with a strict deadline for scheduling, such that a packet is assumed to be useless after its deadline has passed. In one example, for scheduling resources for a delay sensitive flow, resource scheduler 212 can consider parameters such as channel quality, packet delay, and the like.

In many existing wireless communication systems, scheduling algorithms constructed for the accomplishment of the above ends are generally geared toward giving the entire system bandwidth to a single flow at a given time. Further, analysis of the above parameters is conducted on a packet-by-packet basis for each queued packet to be transmitted. However, for wideband systems, in order to ensure the effectiveness of an enacted scheduling policy, it can be appreciated that bandwidth at a given time is often distributed among multiple flows. Further, for systems that utilize high system bandwidth and/or a high number of flows, it can be appreciated that packet-by-packet analysis for resource scheduling is computationally costly and can consequentially result in a loss of system efficiency. Similarly, packet-by-packet analysis can be prohibitively costly for systems that determine resource allocations within short time intervals (e.g., 1 ms or less) and/or other similar wireless communication systems.

In view of at least the above, a base station 210 and/or terminal 220 in system 200 can include respective burst analyzers 214 and/or 222 in accordance with various aspects described herein. In one example, burst analyzers 214 and/or 222 can perform analysis for respective groups (or bursts) of packets that arrive within a predetermined time period of each other rather than for the individual packets themselves, thereby saving computational cost associated with analyzing individual packets. In addition, it can be appreciated that packets that arrive within a sufficiently small time window can have substantially similar deadlines and/or other properties. Accordingly, burst analyzers 214 and/or 222 can analyze a head or leading packet in a burst to determine a relative priority to apply to all packets in the burst.

In accordance with one aspect, a burst analyzer 214 at base station 210 can be utilized in cooperation with a resource scheduler 212 and/or individually to determine an optimal resource schedule for one or more flows that are utilized for communication in system 200. Base station 210 can additionally utilize a processor 216 and/or memory 218 to act as and/or to implement the functionality of resource scheduler 212 and/or burst analyzer 214.

In accordance with another aspect, a burst analyzer 222 at terminal 220 can be utilized in cooperation with a feedback manager 224 and/or individually to generate and communicate feedback regarding respective analyzed bursts to base station 210 and/or another appropriate network entity. Feedback provided by feedback manager 224 can include, for example, burst sizes, head-of-line delay parameters associated with respective packet bursts, and/or other suitable information. Terminal 220 can also utilize a processor 226 and/or memory 228 to act as and/or to implement the functionality of burst analyzer 222 and/or feedback manager 224.

In a further aspect, while not illustrated in system 200, base station 210 can utilize burst analyzer 214 to facilitate feedback to terminal 220 and/or another entity in system 200, and terminal 220 can utilize burst analyzer 222 to facilitate resource scheduling for terminal 220 and/or other entities in system 200.

Figure 3:
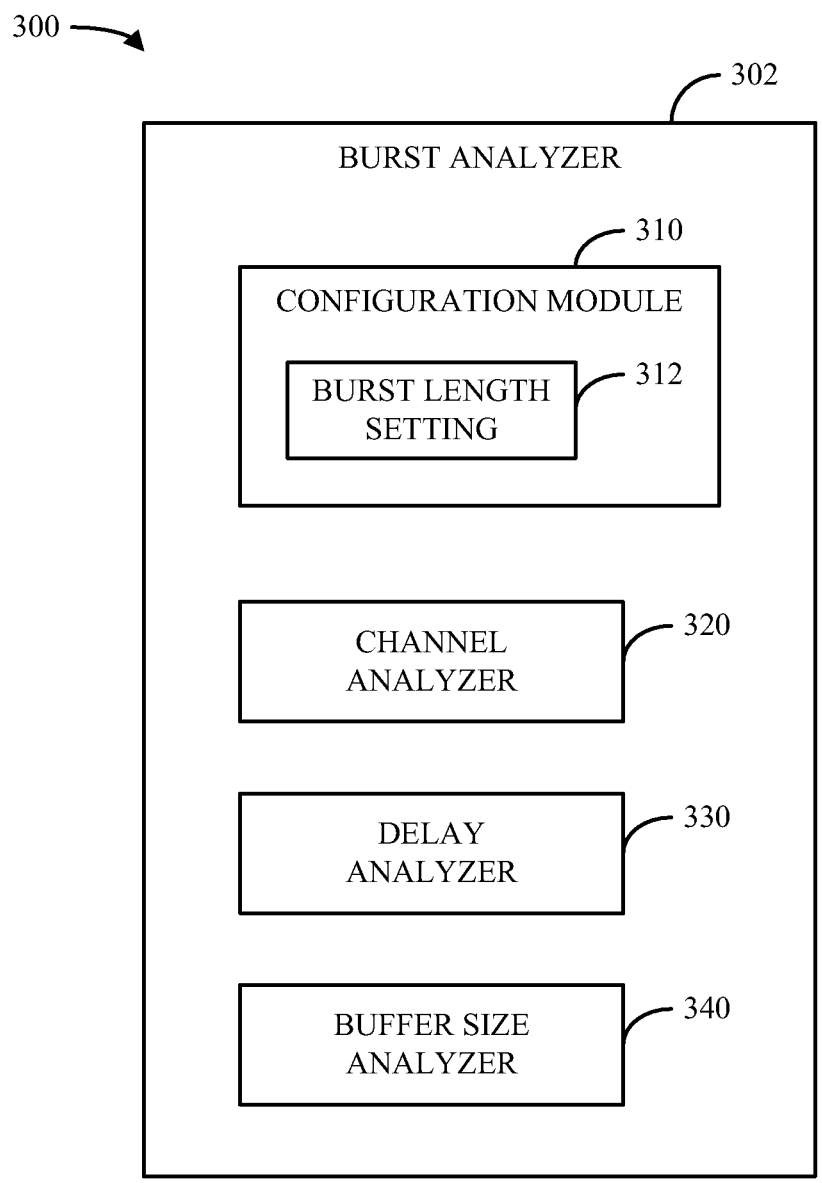
FIG. 3 illustrates a system for analyzing packet bursts to be communicated in a wireless communication system in accordance with various aspects.

Turning now to FIG. 3, a system 300 for analyzing packet bursts to be communicated in a wireless communication system in accordance with various aspects is illustrated. As FIG. 3 illustrates, system 300 can include a burst analyzer 302, which can be utilized by one or more entities in a wireless communication system (e.g., base station 210 and/or terminal 220) to facilitate scheduling communication resources for respective packet bursts. In one example, burst analyzer 302 can include a configuration module 310 for controlling operation of the burst analyzer 302, as well as a channel analyzer 320, a delay analyzer 330, and/or a buffer size analyzer 340 for analyzing various aspects of respective packet bursts.

In accordance with one aspect, configuration module 310 can be utilized to adjust a burst length setting 312 for burst analyzer 302, which represents a predefined amount of time and/or number of subframes for which received packets are grouped into packet bursts. In one example, a burst length setting 312 can be selected for use by burst analyzer 302 to facilitate a tradeoff between information and complexity. For example, a long burst length (e.g., 25 ms) facilitates a reduction in complexity at the cost of information, and a short burst length (e.g., 5 ms) facilitates gathering more information at the cost of complexity.

In accordance with another aspect, based on settings provided by configuration module 310, burst analyzer 302 can determine information relating to respective observed packet bursts. For example, burst analyzer 302 can observe one or more flows to obtain information relating to sizes of respective bursts on the observed flow(s). In one example, burst size can be determined as a number of bytes for a given flow i that arrive within a burst length $\tau$ in time and/or subframes (e.g., as provided by burst length setting 312) from a head-of-line packet and that have been cached. As used herein, burst size can be represented as $s_i(t, \tau)$.

In another example, channel analyzer 320 can be utilized to obtain channel quality information (CQI) relating to one or more sub-bands on which a device associated with burst analyzer 302 communicates. In an example where system resources are provided in terms of frequency, the total frequency band utilized by a system can be denoted as divided into M sub-bands j, handled respectively by resource blocks (RBs) $\{RB_0, \ldots, RB_j, \ldots, RB_{m-1}\}$. Accordingly, assuming a uniform distribution of power, channel analyzer 320 can compute spectral efficiency (e.g., in bits per symbol) corresponding to the modulation and coding scheme (MCS) that is achievable for a flow i at time t in sub-band j for a Hybrid Automatic Repeat Request (H-ARQ) termination target H, which can be denoted as $K_i^j(t, H)$. By way of specific example, H-ARQ termination target H can vary from 0 to 5. In one example, respective flows can be configured with corresponding pre-fixed termination targets (e.g., depending on their QoS types). Accordingly, the dependency on termination target H can be suppressed by channel analyzer 320, and spectral efficiency can be denoted by $K_i^j(t)$ In one example, spectral efficiency can be determined as a function of CQI reported on a given sub-band and a transmission mode utilized to communicate data by a device associated with burst analyzer 302.

In a third example, delay analyzer 330 can be utilized to obtain head-of-line delay information corresponding to one or more flows for which communication is conducted by a device associated with burst analyzer 302. By way of specific example, head-of-line delay can be computed by delay analyzer 330 as the time expired since a head-of-line packet in a flow was received by the Media Access Control (MAC) layer. As used herein, head-of-line delay can be denoted by $d_i(t)$ for a flow i at time t.

In a fourth example, buffer size analyzer 340 can be utilized to obtain buffer size information relating to one or more flows for which communication is conducted by a network entity associated with burst analyzer 302. Buffer size can be determined by buffer size analyzer 340 as, for example, the sum of the number of bytes that are cached for a given flow and the estimated overheads (e.g., headers) for transmitting the cached bytes. As used herein, buffer size at time t for a flow i is denoted as $q_i(t)$.

In accordance with one aspect, resources can be scheduled for delay sensitive flows in various manners. In a first example, scheduling can be performed by computing the number of RBs to be allocated to a flow i to minimize the allocation function $$\sum_{i=1}^{n} c_i g(q_i(t) - b_i K_i(t)),$$

where $g(\ )$ is a strictly increasing convex function, $b_i$ represents the bandwidth allocated to flow i, and $c_i$ is a constant corresponding to flow i. It can be appreciated that such a scheduling policy grants flows corresponding to a UE having relatively high channel quality a higher priority than flows corresponding to a UE with lower channel quality. In addition, it can be appreciated that such a scheduling policy grants a higher priority to flows having larger numbers of buffered bytes.

In one example, constants $c_i$ can be chosen to provide differentiated services to various flow classes, while function g can be chosen to tailor the distribution of delay among the flows. For example, scheduling can be conducted such that a flow with the highest value of $c_i g'(q_i)$ at a given time is given the next available piece of spectral resource, where $g'(\ )$ represents the time derivative of the function $g(\ )$. In one example, this can be achieved by solving the following optimization problem:

$$\min \sum_{i=1}^{n} c_i g(q_i(t) - b_i K_i(t))$$

$$\text{such that } \sum_{i=1}^{n} b_i = B, b_i \geq 0, i = 1, \ldots, n$$

$$\text{and } K_i(t)b_i \leq q_i(t), i = 1, \ldots, n,$$

where $b_i$ represents the bandwidth allocated to flow i and B represents the total system bandwidth. From the above optimization problem, it can be appreciated that a scheduling policy based on said optimization problem can only be utilized to provide approximate delay guarantees due to the fact that head-of-line delay $d_i(t)$ is not used to prioritize flows.

In a second example, strict delay guarantees can be provided based on a scheduling policy which gives highest priority to a flow with the highest function of both channel quality and head-of-line delay. In an example of such a scheduling policy, a function that gives priority to a user and/or flow with a better channel and/or a higher head-of-line delay can be utilized, such that a packet from a flow that maximizes said function is always scheduled. In one example, such a policy requires a scheduler to inspect all of the packets in the buffer of each flow.

Figure 4:
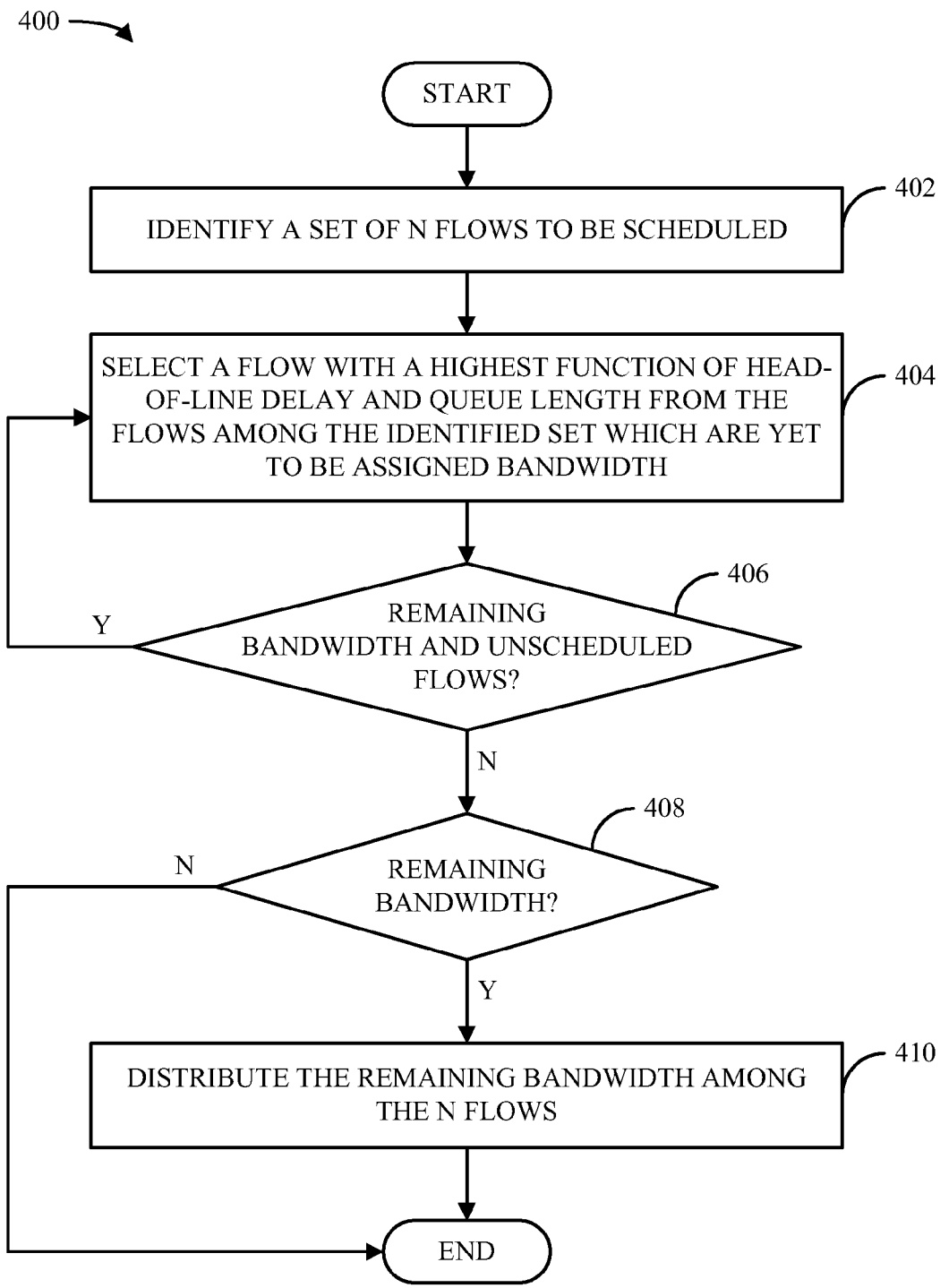
FIG. 4 is a flow diagram of a methodology for burst-based packet scheduling in a wireless communication system.

In view of the above, burst analyzer 302 and/or a similarly suitable burst analyzer can be utilized to provide resource scheduling on a burst-by-burst basis, thereby providing an approximate scheduling policy based on the head-of-line delay of each flow and mitigating the computational complexity of traditional packet-based scheduling techniques. In accordance with one aspect, burst analyzer 302 can schedule resources for one or more delay-sensitive flows as illustrated by methodology 400 in FIG. 4. While, for purposes of simplicity of explanation, methodology 400 is shown and described as a series of acts, it is to be understood and appreciated that methodology 400 is not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement methodology 400 in accordance with one or more aspects.

In accordance with one aspect, methodology 400 begins at block 402, wherein a set of N flows to be scheduled is identified. Methodology 400 can then proceed to block 404, wherein for the N flows identified at block 402, a flow is selected that maximizes a given function of head-of-line delay and queue length from the flows among the set identified at block 402 that have not yet been assigned bandwidth. Upon selecting a flow at block 404, bandwidth can be allocated to the selected flow. For example, a sufficient amount of RBs can be allocated to the selected flow in order to drain out a packet burst at the head of the flow. In another example, flow selection at block 404 can be achieved by sorting the set of flows identified at block 402 in descending order of the given function of head-of-line delay and subsequently selecting the first flow in the sorted set.

Next, at block 406, it can be determined whether both bandwidth and flows remain to be scheduled. If both bandwidth and unscheduled flows remain, methodology 400 can return to block 404 to schedule bandwidth for a new flow. Otherwise, methodology 400 can proceed to block 408 to determine whether bandwidth remains despite all flows being scheduled. If no bandwidth remains, methodology 400 concludes. Otherwise, if it is determined at block 408 that bandwidth remains to be allocated after going through all of the flows identified at block 402, methodology 400 can proceed to block 410 prior to concluding, wherein the remaining bandwidth is distributed among the N flows identified at block 402. In accordance with one aspect, bandwidth can be allocated at block 410 to minimize the sum of squares of queue lengths at the end of the present frame. In accordance with another aspect, it can be appreciated that in the absence of additional information about a queue beyond the burst size, the length of the queue can be utilized in methodology 400 as a substitute for delay.

Figure 5:
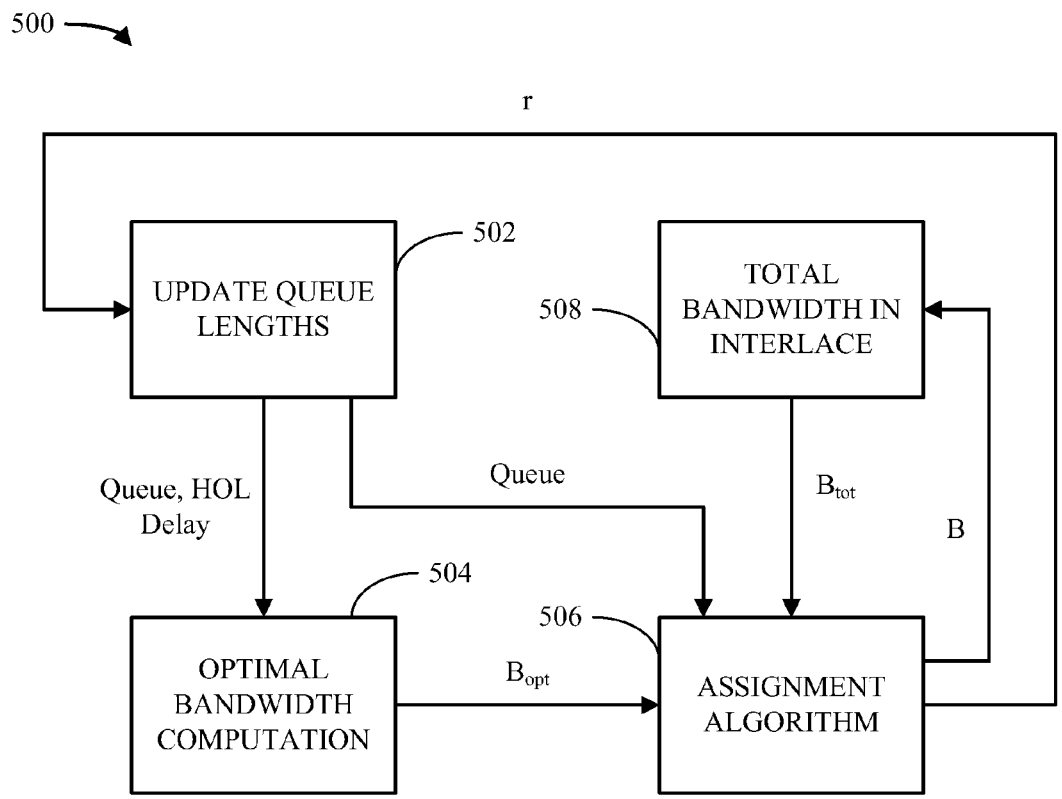
FIG. 5 illustrates a technique for burst-based packet scheduling in a wireless communication system in accordance with various aspects.

Referring now to FIG. 5, a diagram 500 is provided that illustrates an example technique for burst-based packet scheduling in a wireless communication system in accordance with various aspects. As diagram 500 illustrates, burst-based packet scheduling can be implemented as a set of interactions between a queue length update block 502, an optimal bandwidth computation block 504, an assignment algorithm block 506, and total interlace bandwidth block 508.

In one example, queue length update block 502 can be utilized to provide information regarding queue length and head-of-line (HOL) delay for the optimal bandwidth computation block 504. Based on the information from the queue length update block 502, the optimal bandwidth computation block 504 can then be utilized to provide one or more optimal bandwidth parameters $B_{opt}$ to the assignment algorithm block 506. Based on queue length information provided by the queue length update block 502, the optimal bandwidth parameters from the optimal bandwidth computation block 504, and a total bandwidth parameter $B_{tot}$ from the total interlace bandwidth block 508, the assignment algorithm block 506 can provide one or more bandwidth parameters B to the total interlace bandwidth block 508 and one or more rate parameters r to the queue length update block 502.

Figure 6:
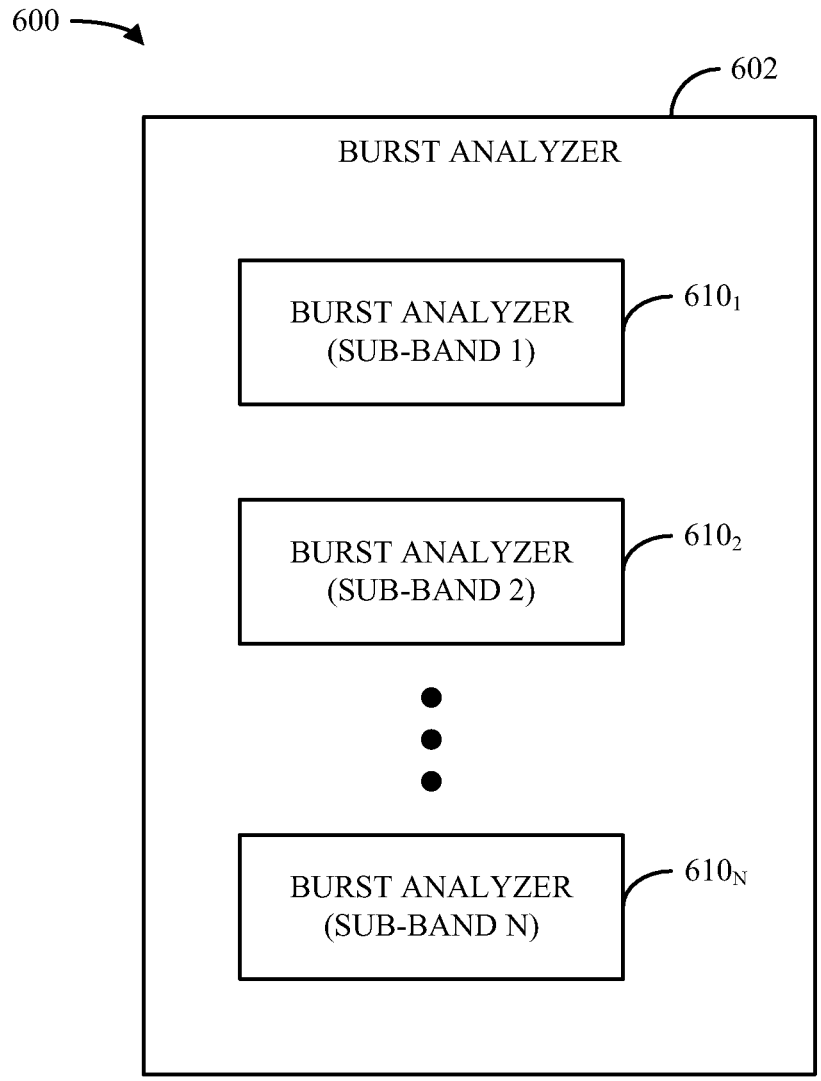
FIG. 6 is a block diagram of a system for analyzing packet bursts to be communicated on multiple frequency sub-bands in accordance with various aspects.

Turning now to FIG. 6, a system 600 for analyzing packet bursts to be communicated on multiple frequency sub-bands in accordance with various aspects is illustrated. In one example, system 600 can include a burst analyzer 602, which can facilitate burst-based resource scheduling in accordance with various aspects described herein. In accordance with one aspect, burst analyzer 602 can include one or more modules 610 for performing resource scheduling on a set of frequency sub-bands utilized by system 600. While FIG. 6 illustrates a separate module 610 for each sub-band utilized in system 600, it should be appreciated that any suitable number of modules 610 can be employed to schedule resources on any appropriate number of sub-bands.

In accordance with another aspect, burst analyzer 602 can optimize a resource schedule for multiple frequency sub-bands by generalizing similar techniques to those utilized for resource scheduling on a single sub-band for the multiple sub-band case. Thus, in one example, the optimization problem for scheduling resources on the basis of a function g of queue lengths as described above for a single sub-band can be generalized for the multiple sub-band case as follows:

$$\min \sum_{i=1}^{n} c_i g\left(q_i(t) - \sum_{j=1}^{m} b_i^j K_i^j(t)\right)$$

$$\text{such that } \sum_{i=1}^{n} b_i = B, \, b_i \geq 0, \, i = 1, \ldots, n$$

$$\text{and } K_i(t) b_i \leq q_i(t), \, i = 1, \ldots, n.$$

It can be appreciated that the above optimization problem is a convex optimization problem that can be solved utilizing one or more techniques described herein and/or generally known in the art. For example, spectral efficiencies $K_i^j(t)$ for respective sub-bands j can be computed, based on which scheduling can be conducted for all applicable flows over all applicable sub-bands.

In accordance with a further aspect, burst analyzer 602 and/or modules 610 can utilize various techniques as described herein to conduct burst-based resource scheduling as an extension of traditional packet-based scheduling, thereby mitigating the computational complexity associated with traditional packet-based scheduling. For example, burst analyzer 602 can utilize methodology 400 and/or any other suitable technique for performing scheduling over multiple frequency sub-bands based on packet burst information.

Figure 7:
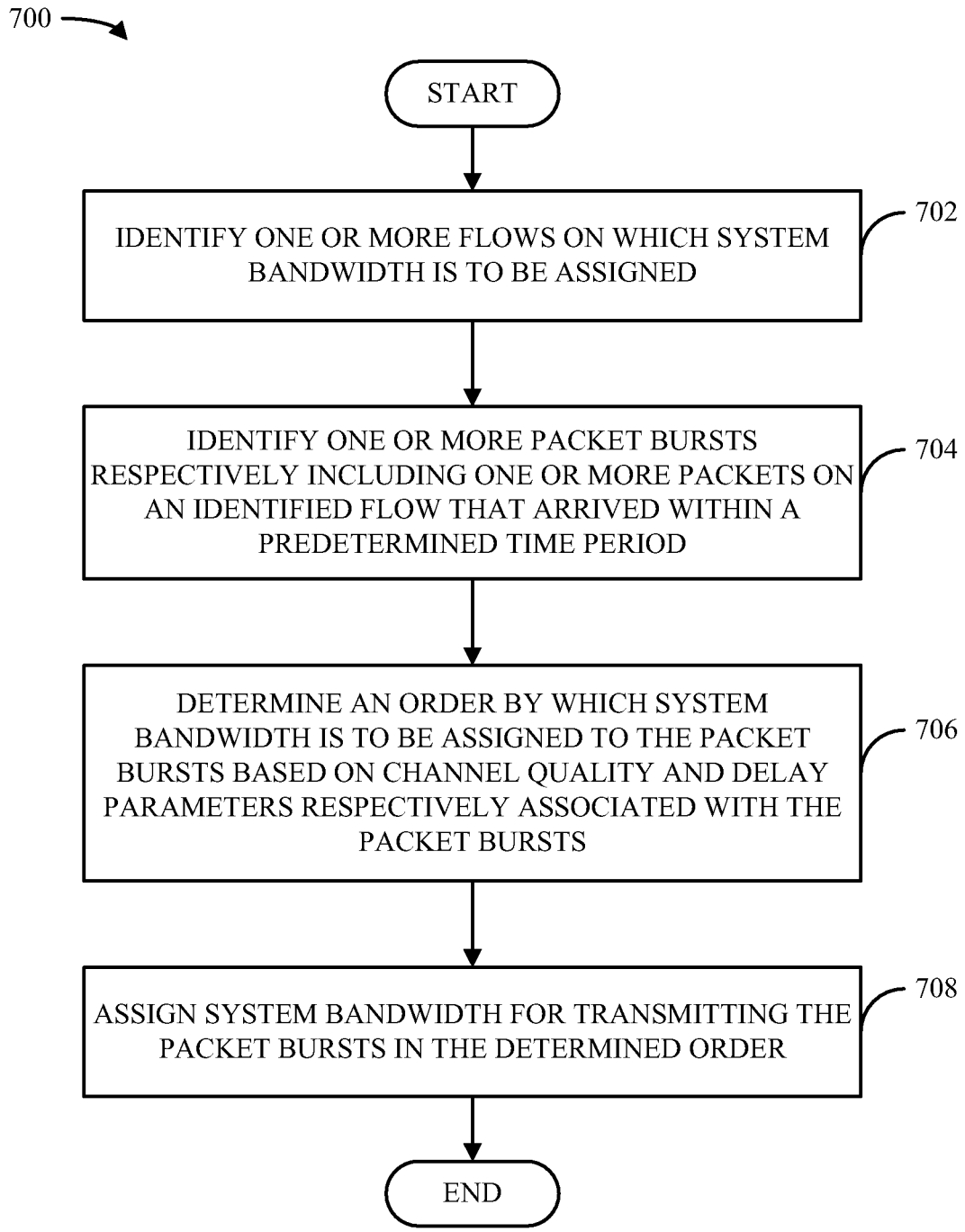
FIGS. 7-8 are flow diagrams of respective methods for scheduling resources for communication in a wireless communication system.
Figure 8:
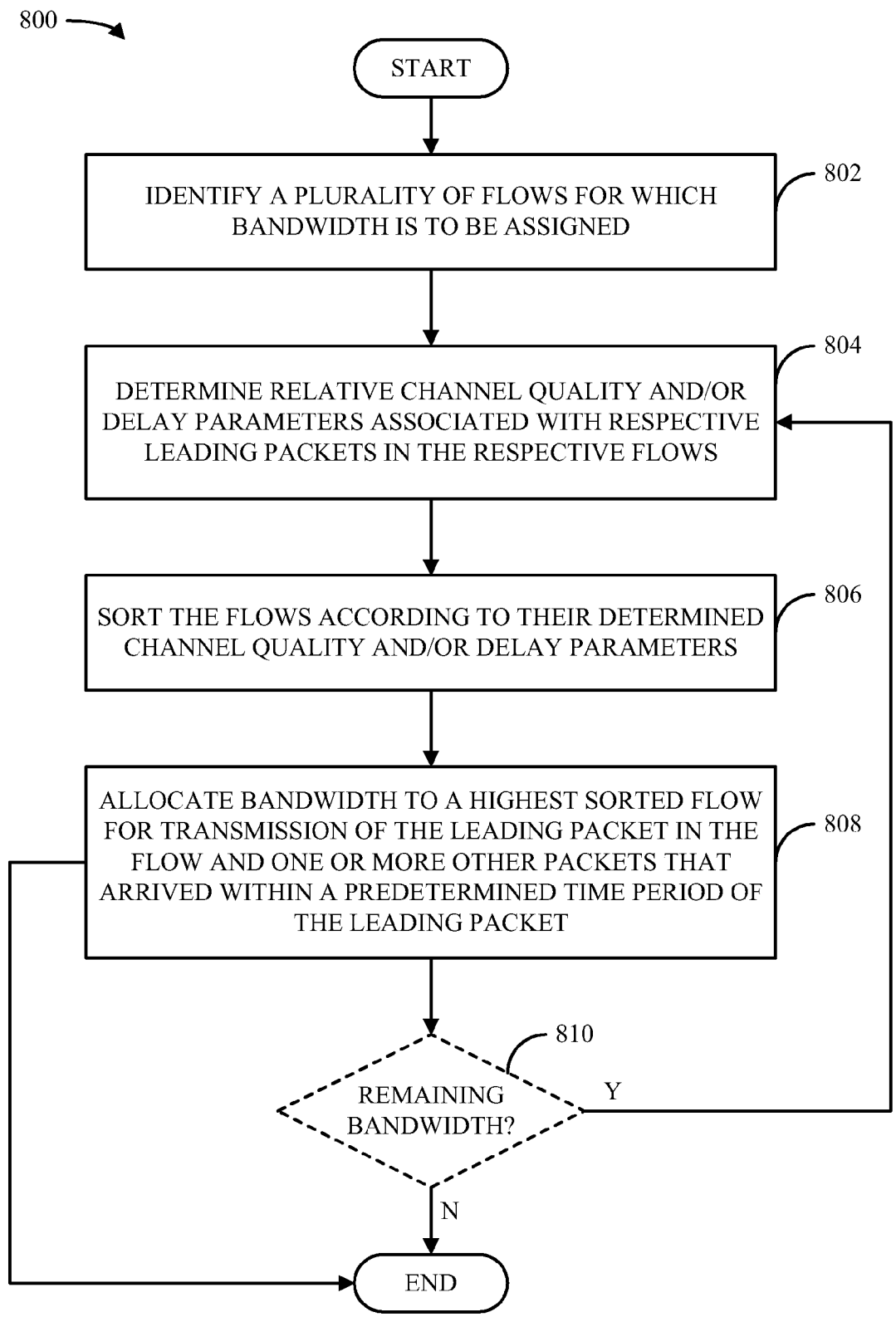
Figure 9:
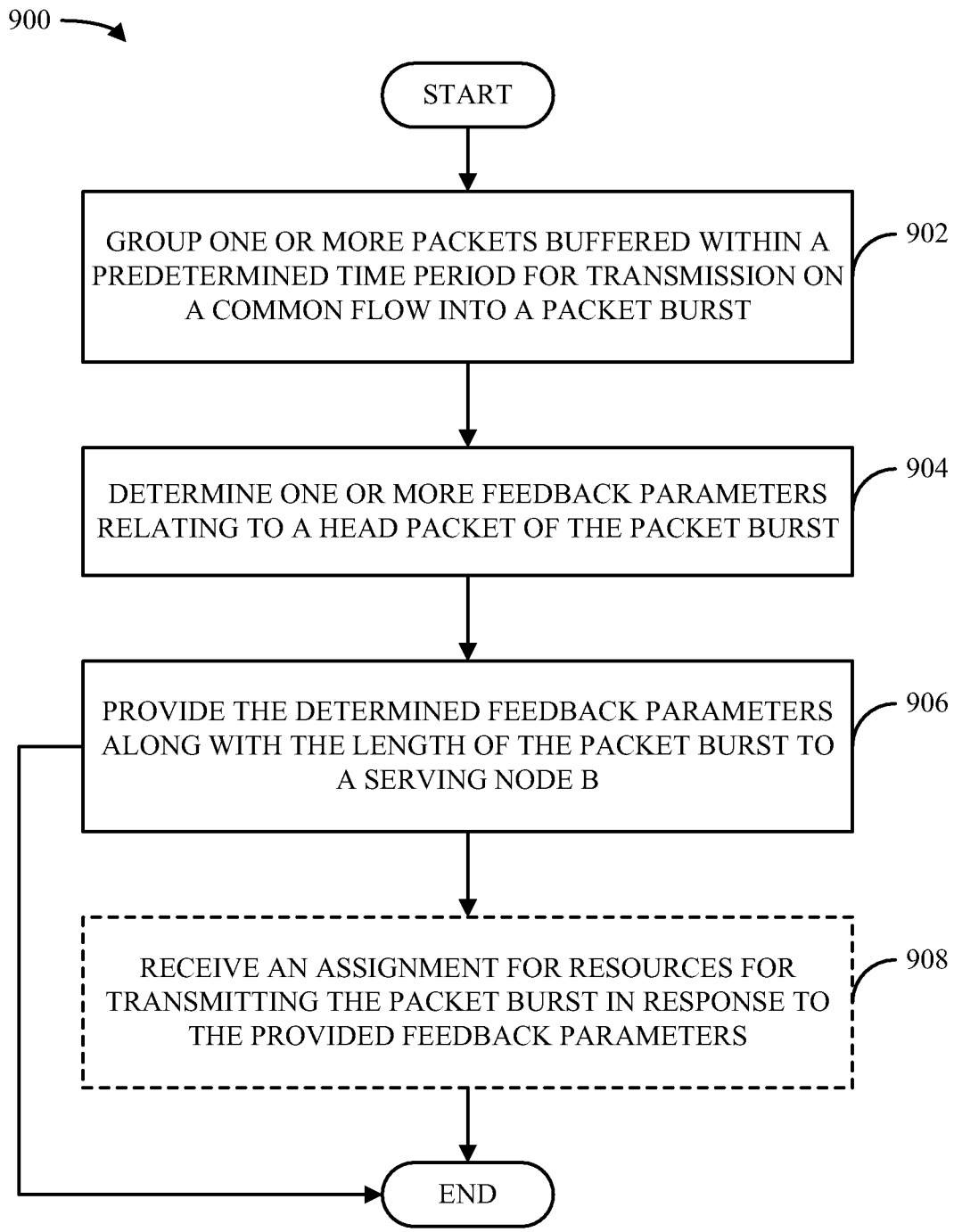
FIG. 9 is a flow diagram of a method for generating and communicating feedback relating to a packet burst.

Referring to FIGS. 7-9, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

With reference to FIG. 7, illustrated is a methodology 700 for scheduling resources for communication in a wireless communication system (e.g., system 200). It is to be appreciated that methodology 700 can be performed by, for example, a Node B (e.g., base station 210) and/or any other appropriate network entity. Methodology 700 begins at block 702, wherein one or more flows on which system bandwidth is to be assigned are identified. Next, at block 704, one or more packet bursts are identified that respectively include one or more packets on a flow identified at block 702 that arrived within a predefined period. In accordance with one aspect, the predetermined time period utilized at block 704 can be fixed and/or adjustable for different network conditions and can facilitate a balancing between completeness of packet information and complexity. For example, the predetermined time period can be substantially large where low complexity is desired and substantially small where detailed information is desired. In one example, packet bursts can be identified at block 704 based on feedback from one or more user devices (e.g., terminals 220), based on packets present at a local transmit buffer, by inferring information relating to the packet bursts from observation of transmissions from other network entities, and/or by other appropriate means.

Upon completing the acts described at block 704, methodology 700 can proceed to block 706, wherein an order by which system bandwidth is to be assigned to the packet bursts identified at block 704 is determined based on channel quality and delay parameters respectively associated with the packet bursts. In one example, the parameters utilized at block 706 can include spectral efficiency information associated with one or more frequency sub-bands, head-of-line delay information, queue and/or burst length information, or the like. In another example, an order can be determined at block 706 by sorting flows for which packet bursts arrive as a function of the parameters utilized at block 706, by determining an optimal flows for respective bandwidth assignments prior to said assignments in a just-in-time manner, and/or by other suitable means.

Methodology 700 can then conclude at block 708, wherein system bandwidth is assigned for transmitting the packet bursts identified at block 704 in the order determined at block 706. In accordance with one aspect, bandwidth assignments made at block 708 can continue as long as system bandwidth remains. In one example, if the packet bursts identified at block 704 are all allocated bandwidth before the total available system bandwidth is exhausted, some or all of the remaining bandwidth can be allocated between the flows identified at block 702 in any suitable manner. For example, remaining bandwidth can be allocated such that the overall delay seen across the flows identified at block 702 is optimized.

FIG. 8 illustrates another methodology 800 for scheduling resources for communication in a wireless communication system. It is to be appreciated that methodology 800 can be performed by, for example, a Node B and/or any other appropriate network device. Methodology 800 begins at block 802, wherein a plurality of flows for which bandwidth is to be assigned are identified. Next, at block 804, relative channel quality and/or delay parameters associated with respective leading packets in the flows identified at block 802 are determined. In one example, determination of parameters at block 804 can be based on feedback obtained from one or more devices in an associated communication system, the state of one or more transmit buffers associated with an entity performing methodology 800, and/or any other suitable factors.

Upon completing the acts described at block 804, methodology 800 can proceed to block 806, wherein the flows identified at block 802 are sorted according to their respective channel quality and/or delay parameters, as determined at block 804. Subsequently, methodology 800 can proceed to block 808, wherein bandwidth is allocated to a highest sorted flow (pursuant to the sorting at block 806) for transmission of the leading packet in the flow and one or more other packets that arrived within a predetermined time period (e.g., burst length) of the leading packet.

In one example, upon completing the acts described at block 808, methodology 800 can conclude. In an alternative example, methodology 800 can proceed to block 810, where it is determined whether bandwidth remains following the allocation at block 808. If it is determined at block 810 that no bandwidth remains, methodology 800 can conclude. Otherwise, methodology 800 can return to block 804 for further bandwidth allocation.

FIG. 9 is a flow diagram of a methodology 900 for generating and communicating feedback relating to a packet burst in a wireless communication system. Methodology 900 can be performed by, for example, a UE (e.g., terminal 220) and/or any other suitable network entity. Methodology 900 begins at block 902, wherein one or more packets buffered within a predetermined time period for transmission on a common flow are grouped into a packet burst.

Upon completing the acts described at block 902, methodology 900 can proceed to block 904, wherein one or more feedback parameters relating to a head packet of the packet burst created at block 902 are determined. Feedback parameters determined at block 904 can include, for example, spectral efficiency data, a head-of-line delay associated with the head packet, and/or other suitable factors. Next, at block 906, the feedback parameters determined at block 904 are provided to a serving Node B along with the length of the packet burst created at block 902. In accordance with one aspect, by providing feedback relating to a packet burst in this manner, a device performing methodology 900 can utilize fewer resources for feedback transmission than a device that performs packet-by-packet feedback. In addition, it can be appreciated that providing burst-based feedback as provided by block 906 can facilitate resource scheduling for a device that performs methodology 900 with substantially less computational complexity as described in accordance with various aspects herein.

After providing feedback at block 906, methodology 900 can conclude. Alternatively, methodology 900 can optionally proceed to block 908 prior to concluding, wherein an assignment for resources for transmitting the packet burst identified at block 902 is received (e.g., from the serving Node B from which feedback was provided at block 906).

Figure 10:
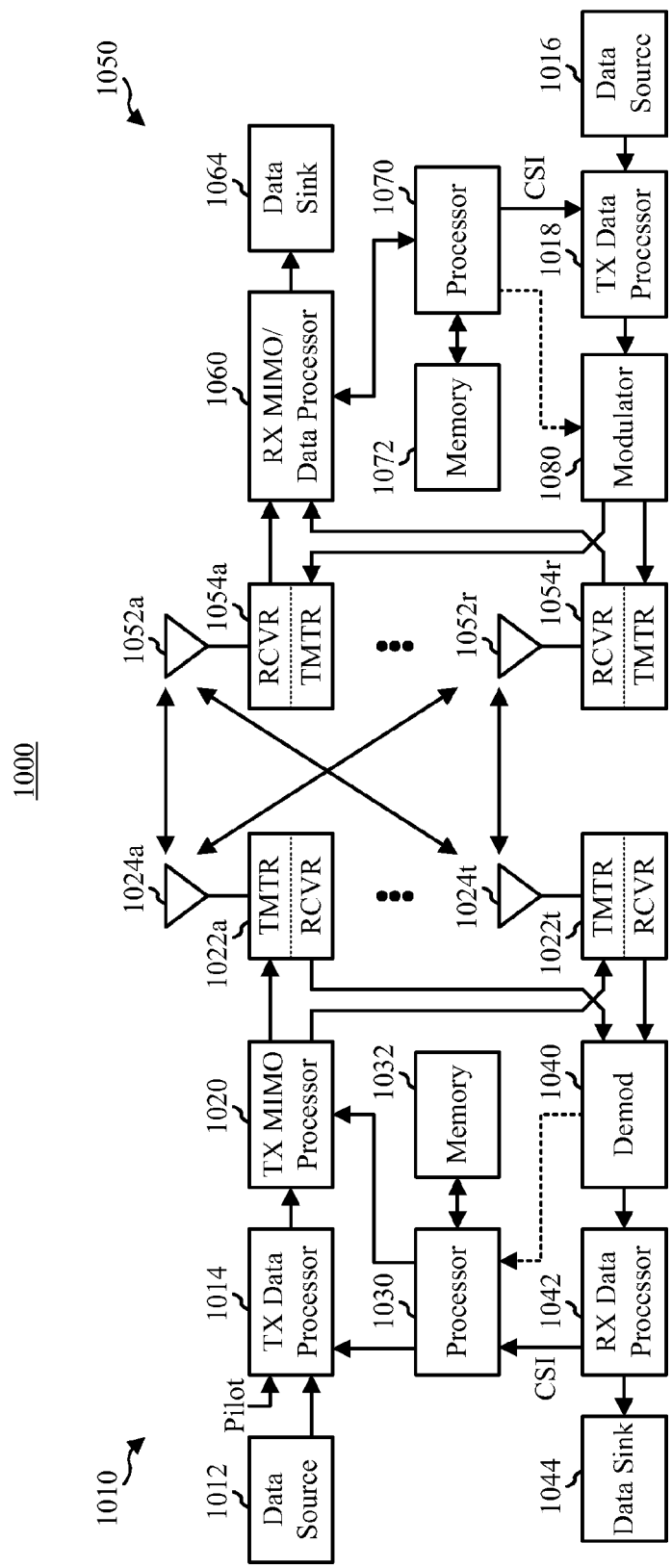
FIG. 10 is a block diagram illustrating an example wireless communication system in which various aspects described herein can function.

Referring now to FIG. 10, a block diagram illustrating an example wireless communication system 1000 in which various aspects described herein can function is provided. In one example, system 1000 is a multiple-input multiple-output (MIMO) system that includes a transmitter system 1010 and a receiver system 1050. It should be appreciated, however, that transmitter system 1010 and/or receiver system 1050 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1010 and/or receiver system 1050 described herein could be utilized in connection with a single output to single input antenna system.

In accordance with one aspect, traffic data for a number of data streams are provided at transmitter system 1010 from a data source 1012 to a transmit (TX) data processor 1014. In one example, each data stream can then be transmitted via a respective transmit antenna 1024. Additionally, TX data processor 1014 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1050 to estimate channel response. Back at transmitter system 1010, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1030.

Next, modulation symbols for all data streams can be provided to a TX processor 1020, which can further process the modulation symbols (e.g., for OFDM). TX MIMO processor 1020 can then provides $N_T$ modulation symbol streams to $N_T$ transceivers 1022a through 1022t. In one example, each transceiver 1022 can receive and process a respective symbol stream to provide one or more analog signals. Each transceiver 1022 can then further condition (e.g., amplify, filter, and upconvert) the analog signals to provide a modulated signal suitable for transmission over a MIMO channel. Accordingly, $N_T$ modulated signals from transceivers 1022a through 1022t can then be transmitted from $N_T$ antennas 1024a through 1024t, respectively.

In accordance with another aspect, the transmitted modulated signals can be received at receiver system 1050 by $N_R$ antennas 1052a through 1052r. The received signal from each antenna 1052 can then be provided to respective transceivers 1054. In one example, each transceiver 1054 can condition (e.g., filter, amplify, and downconvert) a respective received signal, digitize the conditioned signal to provide samples, and then processes the samples to provide a corresponding "received" symbol stream. An RX MIMO/data processor 1060 can then receive and process the $N_R$ received symbol streams from $N_R$ transceivers 1054 based on a particular receiver processing technique to provide $N_T$ "detected" symbol streams. In one example, each detected symbol stream can include symbols that are estimates of the modulation symbols transmitted for the corresponding data stream. RX processor 1060 can then process each symbol stream at least in part by demodulating, deinterleaving, and decoding each detected symbol stream to recover traffic data for a corresponding data stream. Thus, the processing by RX processor 1060 can be complementary to that performed by TX MIMO processor 1020 and TX data processor 1014 at transmitter system 1010. RX processor 1060 can additionally provide processed symbol streams to a data sink 1064.

In accordance with one aspect, the channel response estimate generated by RX processor 1060 can be used to perform space/time processing at the receiver, adjust power levels, change modulation rates or schemes, and/or other appropriate actions. Additionally, RX processor 1060 can further estimate channel characteristics such as, for example, signal-to-noise-and-interference ratios (SNRs) of the detected symbol streams. RX processor 1060 can then provide estimated channel characteristics to a processor 1070. In one example, RX processor 1060 and/or processor 1070 can further derive an estimate of the "operating" SNR for the system. Processor 1070 can then provide channel state information (CSI), which can comprise information regarding the communication link and/or the received data stream. This information can include, for example, the operating SNR. The CSI can then be processed by a TX data processor 1018, modulated by a modulator 1080, conditioned by transceivers 1054a through 1054r, and transmitted back to transmitter system 1010. In addition, a data source 1016 at receiver system 1050 can provide additional data to be processed by TX data processor 1018.

Back at transmitter system 1010, the modulated signals from receiver system 1050 can then be received by antennas 1024, conditioned by transceivers 1022, demodulated by a demodulator 1040, and processed by a RX data processor 1042 to recover the CSI reported by receiver system 1050. In one example, the reported CSI can then be provided to processor 1030 and used to determine data rates as well as coding and modulation schemes to be used for one or more data streams. The determined coding and modulation schemes can then be provided to transceivers 1022 for quantization and/or use in later transmissions to receiver system 1050. Additionally and/or alternatively, the reported CSI can be used by processor 1030 to generate various controls for TX data processor 1014 and TX MIMO processor 1020. In another example, CSI and/or other information processed by RX data processor 1042 can be provided to a data sink 1044.

In one example, processor 1030 at transmitter system 1010 and processor 1070 at receiver system 1050 direct operation at their respective systems. Additionally, memory 1032 at transmitter system 1010 and memory 1072 at receiver system 1050 can provide storage for program codes and data used by processors 1030 and 1070, respectively. Further, at receiver system 1050, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

Figure 11:
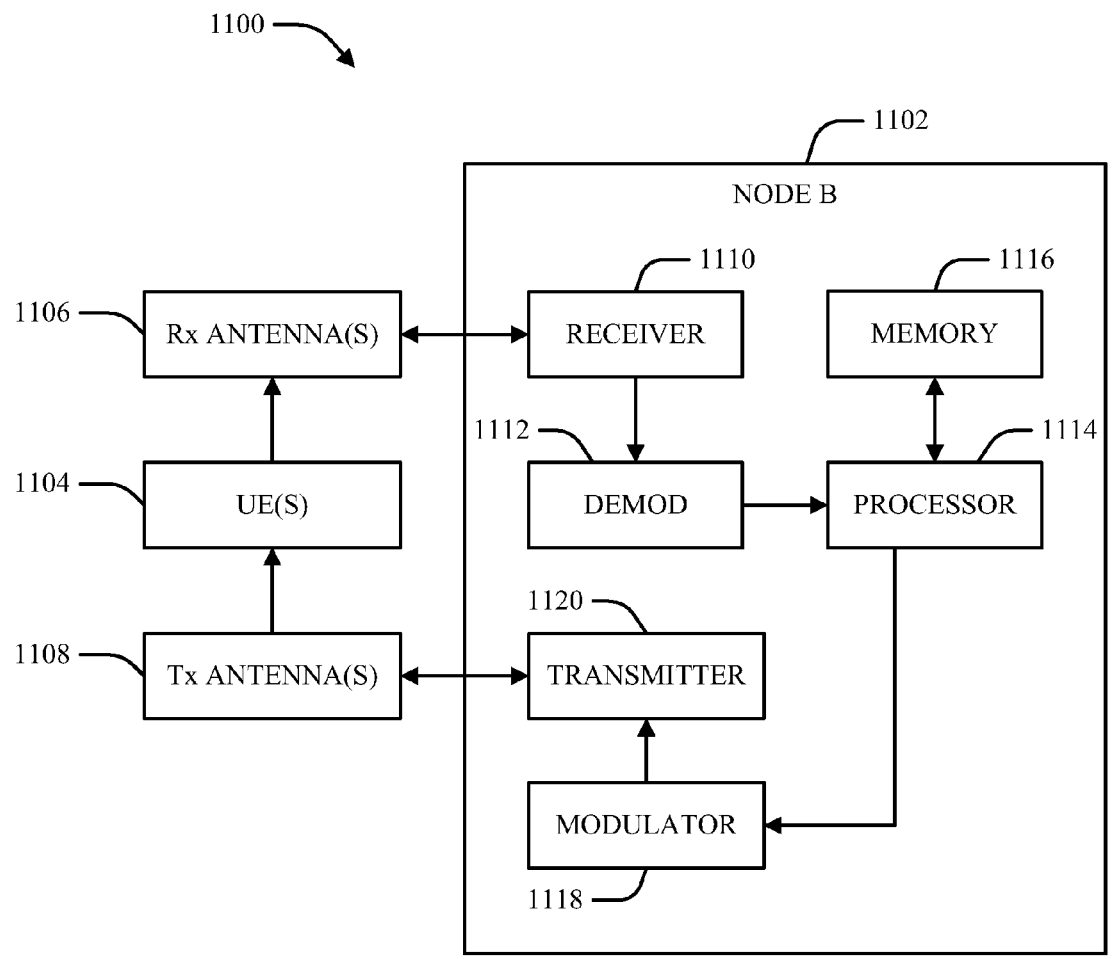
FIGS. 11-12 are block diagrams illustrating example wireless devices operable to implement various aspects described herein.

FIG. 11 is a block diagram of a system 1100 that facilitates resource scheduling in a wireless communication system in accordance with various aspects described herein. In one example, system 1100 includes a base station or Node B 1102. As illustrated, Node B 1102 can receive signal(s) from one or more UEs 1104 via one or more receive (Rx) antennas 1106 and transmit to the one or more UEs 1104 via one or more transmit (Tx) antennas 1108.

Additionally, Node B 1102 can comprise a receiver 1110 that receives information from receive antenna(s) 1106. In one example, the receiver 1110 can be operatively associated with a demodulator (Demod) 1112 that demodulates received information. Demodulated symbols can then be analyzed by a processor 1114. Processor 1114 can be coupled to memory 1116, which can store information related to code clusters, access terminal assignments, lookup tables related thereto, unique scrambling sequences, and/or other suitable types of information. In one example, Node B 1102 can employ processor 1114 to perform methodologies 400, 700, 800, and/or other similar and appropriate methodologies. Node B 1102 can also include a modulator 1118 that can multiplex a signal for transmission by a transmitter 1120 through transmit antenna(s) 1108.

Figure 12:
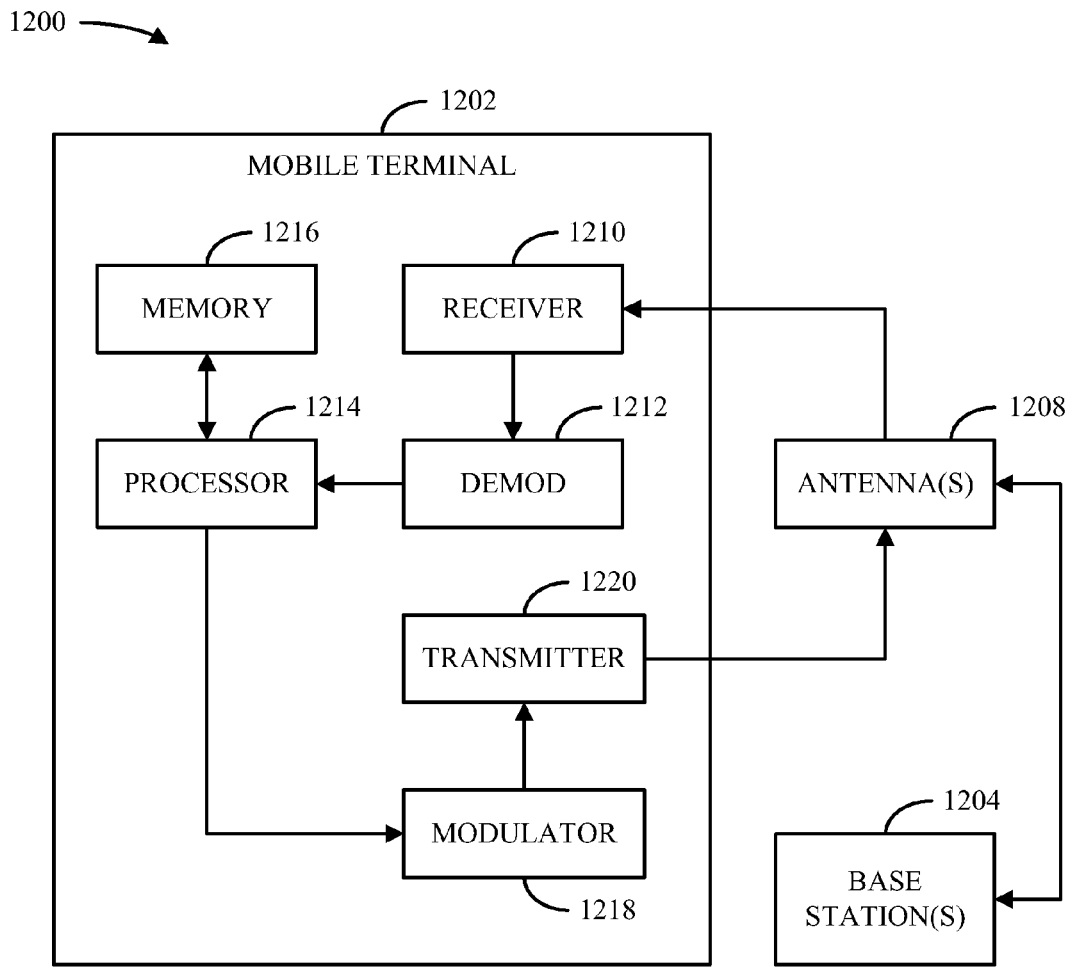

FIG. 12 is a block diagram of a system 1200 that facilitates generation and communication of packet burst feedback in a wireless communication system in accordance with various aspects described herein. In one example, system 1200 includes a mobile terminal 1202. As illustrated, mobile terminal 1202 can receive signal(s) from one or more base stations 1204 and transmit to the one or more base stations 1204 via one or more antennas 1208. Additionally, mobile terminal 1202 can comprise a receiver 1210 that receives information from antenna(s) 1208. In one example, receiver 1210 can be operatively associated with a demodulator (Demod) 1212 that demodulates received information. Demodulated symbols can then be analyzed by a processor 1214. Processor 1214 can be coupled to memory 1216, which can store data and/or program codes related to mobile terminal 1202. Additionally, mobile terminal 1202 can employ processor 1214 to perform methodology 900 and/or other similar and appropriate methodologies. Mobile terminal 1202 can also include a modulator 1218 that can multiplex a signal for transmission by a transmitter 1220 through antenna(s) 1208.

Figure 13:
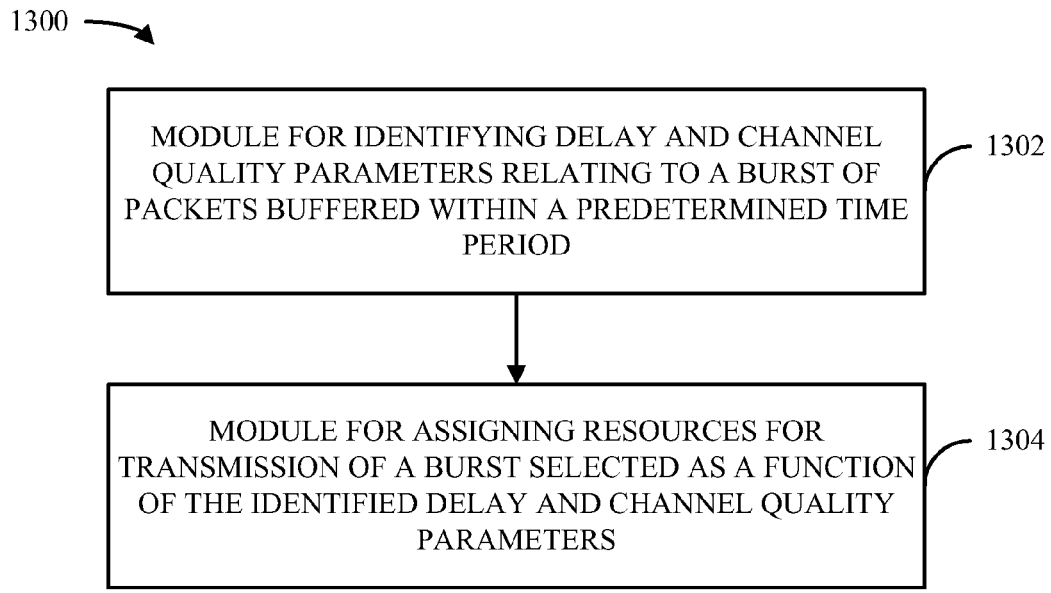
FIG. 13 is a block diagram of an apparatus that facilitates burst-based packet scheduling in a wireless communication system.

FIG. 13 illustrates an apparatus 1300 that facilitates burst-based packet scheduling in a wireless communication system (e.g., system 200). It is to be appreciated that apparatus 1300 is represented as including functional blocks, which can be functional blocks that represent functions implemented by a processor, software, or combination thereof (e.g., firmware). Apparatus 1300 can be implemented in a Node B (e.g., base station 210) and/or any other appropriate network entity and can include a module 1302 for identifying delay and channel quality parameters relating to a burst of packets buffered within a predetermined time period and a module 1304 for assigning resources for transmission of a burst selected as a function of the identified delay and channel quality parameters.

Figure 14:
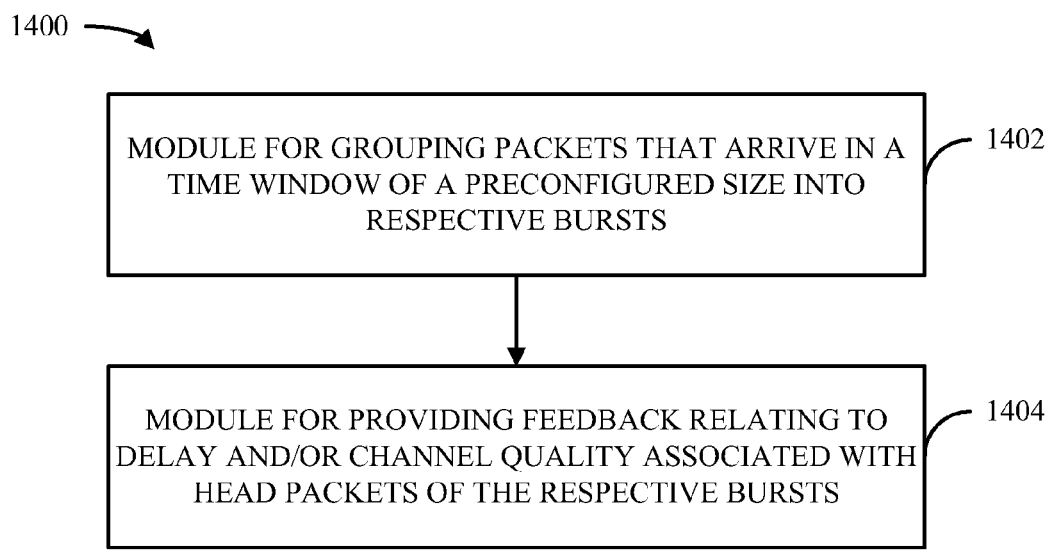
FIG. 14 is a block diagram of an apparatus that facilitates packet burst feedback in a wireless communication system.

FIG. 14 illustrates an apparatus 1400 that facilitates packet burst feedback in a wireless communication system. It is to be appreciated that apparatus 1400 is represented as including functional blocks, which can be functional blocks that represent functions implemented by a processor, software, or combination thereof (e.g., firmware). Apparatus 1400 can be implemented in a mobile terminal (e.g., terminal 220) and/or any other appropriate network entity and can include a module 1402 for grouping packets that arrive in a time window of a preconfigured size into respective bursts and a module 1404 for providing feedback relating to delay and/or channel quality associated with head packets of the respective bursts.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for scheduling resources in a wireless communication system, comprising:
    adjusting a burst length setting for executing a burst-based analysis upon received packets, the burst length setting comprising a predefined amount of time;
    identifying one or more flows that are yet to be assigned bandwidth;
    associating respective packet bursts with the one or more flows, the packet bursts respectively comprising a leading packet for an associated flow and one or more packets that arrive for the associated flow within the predefined amount of time with respect to the leading packet;
    analyzing the respective packet bursts by at least determining delay parameters and channel quality parameters associated with each of the respective packet bursts, the determined delay parameters comprising delay values representing an amount of time expired since the leading packet of the respective packet burst was received; and
    determining an order by which bandwidth is to be assigned to the one or more flows based on the analysis of the respective packet bursts wherein said adjusting the burst length setting is based at least in part on a target complexity level.

2. The method of claim 1, wherein the determining delay parameters comprises determining head-of-line delay values for respective leading packets associated with the respective packet bursts.

3. The method of claim 1, wherein the analyzing comprises determining respective amounts of buffered information for flows corresponding to the respective packet bursts, and the determining an order by which bandwidth is to be assigned comprises determining an order by which bandwidth is to be assigned to the one or more flows based on the determined amounts of buffered information.

4. The method of claim 1, wherein the determining channel quality parameters includes determining spectral efficiency values for flows corresponding to the respective packet bursts.

5. The method of claim 4, wherein the determining spectral efficiency values includes determining spectral efficiency values for a plurality of frequency sub-bands.

6. The method of claim 1, further comprising assigning bandwidth to a flow for transmission of a packet burst corresponding to the flow based on the determined order.

7. The method of claim 6, wherein the determining an order by which bandwidth is to be assigned comprises sorting the one or more flows based on the analysis of the respective packet bursts, and the assigning bandwidth comprises assigning available bandwidth to the one or more flows for transmission of packet bursts respectively corresponding thereto in an order determined by the sorting.

8. The method of claim 6, wherein the assigning bandwidth further comprises:
    determining whether bandwidth remains after assigning bandwidth to the one or more flows for transmission of packet bursts respectively corresponding thereto; and
    distributing remaining bandwidth among the one or more flows upon determining that bandwidth remains.

9. The method of claim 6, further comprising communicating an assignment of bandwidth to one or more user devices.

10. The method of claim 1, wherein the analyzing comprises receiving feedback relating to the respective packet bursts from one or more user devices.

11. The method of claim 1, wherein adjusting the burst length setting is based at least in part on a level of complexity for analyzing the respective packet bursts.

12. A wireless communications apparatus, comprising:
a memory that stores data relating to one or more flows for which communication resources are to be assigned; and
a processor configured to:
adjust a burst length setting for executing a burst-based analysis upon received packets, the burst length setting comprising a predefined amount of time;
analyze bursts of packets on respective flows that respectively include a head packet and one or more packets that arrive within the predefined amount of time after the head packet, said analyzing comprising determining delay parameters and channel quality parameters associated with each of the respective packet bursts, the determined delay parameters comprising delay values representing an amount of time expired since the leading packet of the respective packet burst was received; and
identify a flow to receive an assignment of communication resources based on the analysis wherein said adjust the burst length setting is based at least in part on a target complexity level.

13. The wireless communications apparatus of claim 12, wherein the delay parameters include head-of-line delay parameters associated with head packets for the respective flows.

14. The wireless communications apparatus of claim 12, wherein the processor is further configured to determine the delays as a function of respective amounts of information queued for the respective flows.

15. The wireless communications apparatus of claim 12, wherein the channel quality information includes spectral efficiencies respectively associated with the one or more flows.

16. The wireless communications apparatus of claim 15, wherein the processor is further configured to determine spectral efficiencies associated with the one or more flows over a plurality of sub-bands in frequency.

17. The wireless communications apparatus of claim 12, wherein the processor is further configured to assign resources for communication of a burst of packets associated with the identified flow.

18. The wireless communications apparatus of claim 17, wherein the processor is further configured to determine whether communication resources remain to be assigned after assigning resources for communication of respective bursts of packets associated with the one or more flows, and to distribute remaining communication resources among the one or more flows upon determining that communication resources remain to be assigned.

19. The wireless communications apparatus of claim 18, wherein the processor is further configured to distribute the remaining communication resources among the one or more flows such that a sum of squares of queue lengths of the one or more flows is minimized.

20. The wireless communications apparatus of claim 17, wherein the processor is further configured to communicate an assignment of communication resources to a wireless terminal.

21. The wireless communications apparatus of claim 12, wherein the processor is further configured to receive information relating to bursts of packets respectively corresponding to one or more flows from one or more wireless terminals.

22. An apparatus that facilitates burst-based packet analysis in a wireless communication system, the apparatus comprising:
means for adjusting a burst length setting for executing the burst-based packet analysis upon received packets, the burst length setting comprising a predefined amount of time;
means for identifying delay parameters and channel quality parameters relating to a burst of packets buffered within the predefined amount of time of arrival of a leading packet, the identified delay parameters comprising delay values representing an amount of time expired since the leading packet of the packet burst was received; and
means for assigning resources for transmission of a burst of packets based on the burst-based packet analysis wherein said means for adjusting the burst length setting is based at least in part on a target complexity level.

23. A computer program product, comprising:
a non-transitory, computer-readable medium storing executable instructions, the instructions comprising:
code for adjusting a burst length setting for executing a burst-based analysis upon received packets, the burst length setting comprising a predefined amount of time;
code for identifying one or more flows having associated therewith one or more packets for which resources are to be assigned for communication thereof;
code for grouping packets into respective packet bursts associated with a common flow, wherein the packets of each respective packet burst originate within the predefined amount of time with respect to a leading packet of each respective packet burst;
code for identifying delay parameters and channel quality parameters associated with the respective packet bursts, the delay parameters comprising delay values representing an amount of time expired since the leading packet of the packet burst was received; and
code for assigning resources for communication of a packet burst based on the burst-based analysis wherein said adjusting the burst length setting is based at least in part on a target complexity level.

24. An integrated circuit that executes computer-executable instructions that, when executed by the integrated circuit, cause the integrated circuit to perform a method comprising:
adjusting a burst length setting for executing a burst-based analysis upon received packets, the burst length setting comprising a predefined amount of time;
selecting, from among a plurality of flows which are yet to be assigned bandwidth, a flow with a highest function of head-of-line delay and channel quality;
scheduling a transmission of a packet burst associated with the selected flow, the packet burst comprising a leading packet and one or more packets which originated within the predefined amount of time following the leading packet, wherein said scheduling the transmission of the packet burst is based at least partly on a delay parameter and a channel quality parameter associated with the packet burst, the delay parameter comprising an amount of time expired since the leading packet was received; and
assigning bandwidth for the scheduled transmission based at least partly on the delay parameter and channel quality parameter associated with the packet burst wherein said adjusting the burst length setting is based at least in part on a target complexity level.

25. A method for communicating feedback information in a wireless communication system, comprising:

grouping one or more packets buffered for transmission on a common flow into a packet burst, wherein the one or more packets of the packet burst originate within a predetermined time interval of a leading packet of the packet burst;
determining a length of the packet burst;
analyzing the packet burst, said analyzing comprising:
adjusting a burst length setting comprising a predefined amount of time;
determining a delay parameter and a channel quality parameter associated with the packet burst, the delay parameter comprising a delay value representing an amount of time expired since the leading packet was received;
assigning bandwidth to the flow based at least partly on the delay parameter and the channel quality parameter associated with the packet burst; and
communicating feedback information to a serving base station, based on the analyzing wherein said adjusting the burst length setting is based at least in part on a target complexity level.

26. The method of claim 25, further comprising:
communicating the delay parameter to the serving base station.

27. The method of claim 25, further comprising:
communicating the determined channel quality information to the serving base station.

28. The method of claim 27, wherein the determining channel quality information includes determining channel quality information for a plurality of frequency sub-bands.

29. The method of claim 25, further comprising receiving an assignment of scheduled resources for transmission of the packet burst from the serving base station upon communicating the length of the packet burst to the serving base station.

30. The method of claim 29, further comprising transmitting the packet burst using the scheduled resources.

31. The method of claim 25, further comprising adjusting the predefined amount of time based on a level of complexity associated with the analyzing.

32. A wireless communications apparatus, comprising:
a memory that stores data relating to one or more packets associated with a common flow; and
a processor configured to:
adjust a burst length setting for executing a burst-based analysis, the burst length setting comprising a predefined amount of time;
determine an amount of packets associated with the common flow that originated within the predefined amount of time from a leading packet associated with the common flow,
associate the packets with a packet burst;
analyze the packet burst, said analyzing comprising determining a delay parameter and a channel quality parameter associated with the packet burst, the delay parameter comprising a delay value representing an amount of time expired since the leading packet was received;
assign bandwidth to the flow based at least partly on the delay parameter and the channel quality parameter; and
communicate the determined amount of packets within a transmission of control signaling wherein said adjusting the burst length setting is based at least in part on a target complexity level.

33. The wireless communications apparatus of claim 32, wherein the processor is further configured to communicate the delay parameter within the transmission of control signaling.

34. The wireless communications apparatus of claim 32, wherein the processor is further configured to communicate the determined channel quality information within the transmission of control signaling.

35. The wireless communications apparatus of claim 34, wherein the processor is further configured to determine and communicate the channel quality information for a plurality of sub-bands in frequency.

36. The wireless communications apparatus of claim 32, wherein the processor is further configured to receive a communication schedule in response to the transmission of control signaling, and to communicate the packets associated with the common flow that originated within the time interval from a leading packet associated with the common flow based on the communication schedule.

37. The wireless communications apparatus of claim 32, wherein the processor is further configured to adjust the predefined amount of time based on a level of complexity of the analyzing.

38. An apparatus that facilitates packet burst feedback in a wireless communication system, the apparatus comprising:
means for preconfiguring a size of a time window to execute a burst-based analysis upon packets;
means for grouping packets into respective bursts, wherein the packets arrive in the time window with respect to a leading packet of each respective burst;
means for analyzing the packet bursts, said means for analyzing comprising means for determining a delay parameter and a channel quality parameter associated with each of the packet bursts, the delay parameter comprising a delay value representing an amount of time expired since the leading packet was received;
means for assigning bandwidth to the packet bursts based at least partly on the delay parameter and the channel quality parameter associated with each of the packet bursts; and
means for communicating feedback relating to lengths of the respective bursts wherein said means for preconfiguring the size of the time window is based at least in part on a target complexity level.

39. A computer program product, comprising:
a non-transitory computer-readable medium storing executable instructions, the instructions, comprising:
code for adjusting a burst length setting for executing a burst-based analysis, the burst length setting comprising a predefined amount of time;
code for identifying a packet burst that includes a leading packet designated for a flow and one or more packets for the flow that originated within the predefined amount of time with respect to the leading packet;
code for analyzing the packet burst, said code for analyzing comprising code for determining a delay parameter and a channel quality parameter associated with the packet burst, the delay parameter comprising a delay value representing an amount of time expired since the leading packet was received;
code for assigning bandwidth to the packet burst based at least partly on the delay parameter and the channel quality parameter associated with the packet burst;
code for determining one or more feedback parameters relating to the packet burst, the feedback parameters comprising a length of the packet burst; and code for transmitting control signaling comprising the one or more feedback parameters wherein said adjusting the burst length setting is based at least in part on a target complexity level.

40. An integrated circuit that executes computer-executable instructions for managing feedback relating to a wireless communication device, the instructions comprising:

adjusting a burst length setting for executing a burst-based analysis, the burst length setting comprising a predefined amount of time;

identifying a packet burst comprising a grouping of packets designated for a flow having times of origination within the predefined amount of time of a head packet designated for the flow;

analyzing the packet burst, said analyzing comprising determining a delay parameter and a channel quality parameter associated with the packet burst, the delay parameter comprising a delay value representing an amount of time expired since the head packet was received;

assigning bandwidth to the packet burst based at least partly on the delay parameter and the channel quality parameter associated with the packet burst;

determining a number of packets in the identified grouping; and conveying the determined number of packets in combination with feedback relating to the head packet designated for the flow to a serving base station wherein said adjusting the burst length setting is based at least in part on a target complexity level.

41. The method of claim 1, wherein the predefined amount of time is determined through analysis of factors including:

completeness of packet information; and processing complexity.

42. The method of claim 25, wherein the predefined amount of time is determined through analysis of factors including:

completeness of packet information; and processing complexity.

* * * * *